S. TRUDEAU.
SPRAYING APPARATUS.
APPLICATION FILED APR. 21, 1910.
974,540.
Patented Nov. 1, 1910.
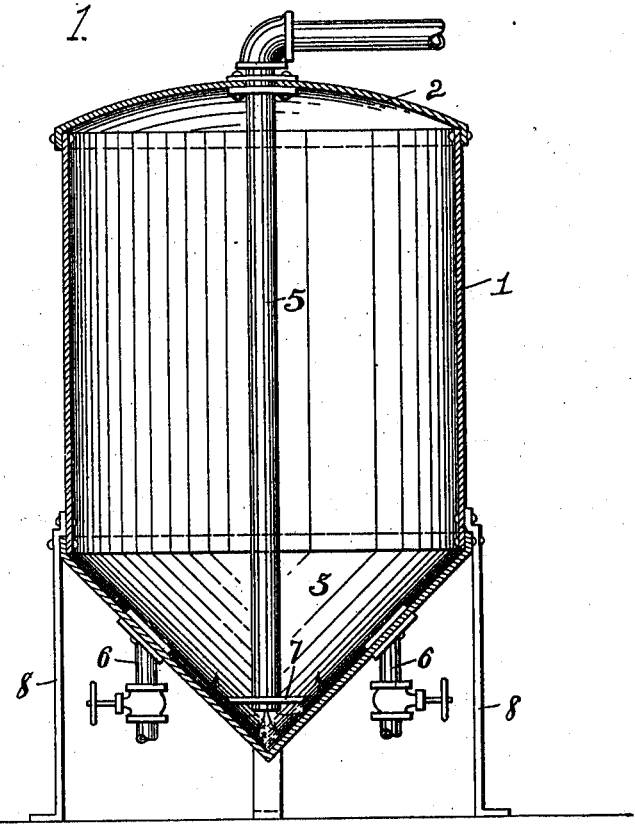
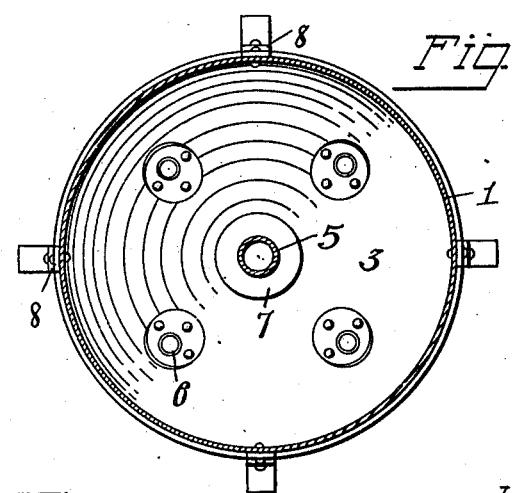
WITNESSES:
C. H. Bills.
E. E. Thomas.
INVENTOR.
Samuel Trudeau,
By Owen & Owen,
His attys.

UNITED STATES PATENT OFFICE.

SAMUEL TRUDEAU, OF TOLEDO, OHIO.

SPRAYING APPARATUS.

974,540.  Specification of Letters Patent.  Patented Nov. 1, 1910.

Application filed April 21, 1910. Serial No. 556,709.

*To all whom it may concern:*

Be it known that I, SAMUEL TRUDEAU, a citizen of the United States, and a resident of Toledo, in the county of Lucas and State of Ohio, have invented a certain new and useful Spraying Apparatus; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to apparatus for the spraying of paints, insect exterminating solutions or other liquids which need to be constantly agitated or worked to maintain the same in a thoroughly mixed state and to prevent a settling of the heavier particles held in suspension within the solution.

The object of my invention is the provision, in an apparatus of this class, of pneumatic means in combination with a tank of peculiar design which coöperates to create a constant agitation of the liquid to prevent a settling of sediment or heavy particles held in suspension within the solution during the drawing of liquid from the tank, thus enhancing the practicability and commercial value of apparatus of this class.

The invention is fully described in the following specification and a preferred embodiment of the same illustrated in the accompanying drawings, in which,—

Figure 1 is a central vertical section of the apparatus embodying my invention, and Fig. 2 is a cross section thereof.

Referring to the drawings, 1 designates a tank or liquid receptacle, preferably of cylindrical form in cross-section, the upper end of which is closed and made air tight by a cap or top 2, while the lower end thereof is provided with an outwardly projecting conical bottom 3, as shown.

A pipe 5, which leads from any suitable source of air supply under pressure, is projected through the top 2 and down into the receptacle with its discharge end terminating adjacent the center or apex of the bottom, whereby air as it is discharged from such pipe is directed into the point or apex of the bottom to constantly agitate the liquid at such point and prevent a settling of sediment therein. The air admitted to the receptacle through such pipe also serves to create a pressure within the tank for forcing the contained liquid therefrom through the delivery pipes 6 which are tapped into or otherwise suitably secured to the bottom 3.

To facilitate the agitation of the liquid within the bottom of the receptacle by the air discharging thereinto, a deflector plate 7 is mounted on the discharge end of the pipe 5 and causes the air discharged from the pipe 5 to hug the inclined walls of the bottom 3 in its ascent.

8 designates supporting legs for the tank.

In the spraying of insect killing solutions for plants or the like it is very important that the heavy particles in suspension within the solution be maintained in constant agitation to prevent a settling of the same in the bottom of the tank. In the use of the spraying apparatus herein described this is effectually accomplished due to the provision of the conical bottom 3 and the locating of the discharge end of the air pressure pipe 5 adjacent the apex of the bottom whereby the emitted air is discharged downwardly into such apex to agitate any sediment accumulating therein and thence is directed upwardly by the inclined sides of the bottom portion, being outwardly deflected in such ascent by the deflector plate 7, to further facilitate the agitating action. In practice it is found that this construction of apparatus is highly efficient in its operation and is especially valuable for use in connection with the spraying of trees or the like as it effectually maintains the heavier particles of the solution in suspension therein and obviates the use of any mechanical agitating means for such purpose.

I wish it understood that my invention is not limited to any specific construction or arrangement of the parts except in so far as such limitations are specified in the claim.

Having thus described my invention, what I claim as new and desire to secure by Letters Patent, is,—

In an apparatus of the class described, in combination, a closed receptacle having an outwardly projecting conical bottom, liquid discharge pipes tapped into such bottom around its apex, a pipe communicating with a source of fluid under pressure and projecting into the receptacle with its discharge end directed toward and terminating adjacent the bottom apex, and a deflector plate carried by said latter pipe adjacent its discharge end, substantially as and for the purpose described.

In testimony whereof I have hereunto signed my name to this specification in the presence of two subscribing witnesses.

SAMUEL TRUDEAU.

Witnesses:
 C. W. OWEN,
 C. H. BILLS.